(12) United States Patent
Tangren

(10) Patent No.: US 6,556,382 B1
(45) Date of Patent: *Apr. 29, 2003

(54) MASS BALANCING FOR OPTIMIZING SUSPENSION RESONANCE PERFORMANCE

(75) Inventor: John H. Tangren, St. Paul, MN (US)

(73) Assignee: Hutchinson Technology, Inc., Hutchinson, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 854 days.

(21) Appl. No.: 08/828,297

(22) Filed: Mar. 28, 1997

Related U.S. Application Data

(60) Provisional application No. 60/014,336, filed on Mar. 29, 1996.

(51) Int. Cl.[7] ................................................. G11B 5/49
(52) U.S. Cl. ............................... 360/244.8; 360/244.9
(58) Field of Search ............................ 360/103–104, 360/244.5, 244.9, 245, 244.8

(56) References Cited

U.S. PATENT DOCUMENTS

| | | | | |
|---|---|---|---|---|
| 4,996,616 A | * | 2/1991 | Aoyagi et al. | 360/104 |
| 5,003,420 A | * | 3/1991 | Hinlein | 360/104 |
| 5,027,239 A | | 6/1991 | Hagen | 360/104 |
| 5,027,241 A | * | 6/1991 | Hatch et al. | 360/104 |
| 5,057,953 A | * | 10/1991 | Wanlass | 360/104 |
| 5,107,383 A | | 4/1992 | Takeuchi et al. | 360/104 |
| 5,126,904 A | * | 6/1992 | Sakurai | 360/104 |
| 5,313,353 A | * | 5/1994 | Kohso et al. | 360/104 |
| 5,333,085 A | * | 7/1994 | Prentice et al. | 360/104 |
| 5,339,208 A | | 8/1994 | Yumura et al. | 360/104 |
| 5,367,419 A | | 11/1994 | Kazama | 360/103 |
| 5,386,331 A | | 1/1995 | Wolter | 360/104 |
| 5,408,372 A | | 4/1995 | Karam, II | 360/104 |
| 5,455,727 A | * | 10/1995 | Baral et al. | 360/104 |
| 5,461,525 A | | 10/1995 | Christianson et al. | 360/104 |
| 5,471,734 A | * | 12/1995 | Hatch et al. | 360/104 |
| H1573 H | * | 8/1996 | Budde | 360/104 |
| 5,594,607 A | | 1/1997 | Erpelding et al. | 360/104 |
| 5,606,477 A | | 2/1997 | Erpelding et al. | 360/104 |
| 5,657,187 A | | 8/1997 | Hatch et al. | 360/104 |
| 5,815,348 A | * | 9/1998 | Danielson et al. | 360/104 |
| 5,894,381 A | * | 4/1999 | Allen et al. | 360/104 |

FOREIGN PATENT DOCUMENTS

| | | |
|---|---|---|
| JP | Sho62-76079 | 4/1987 |
| WO | WO 97/07502 | 2/1997 |

* cited by examiner

*Primary Examiner*—Brian E. Miller
(74) *Attorney, Agent, or Firm*—Faegre & Benson LLP

(57) ABSTRACT

A disk drive suspension in which resonance characteristics are adjustable and a method for such adjustment. The disk drive suspension includes a load beam, a head mounting region and one or more mass balancing structures. The mass balancing structures are adapted for permanent displacement or removal to adjust mass distribution of the load beam. In this way, resonance characteristics of the load beam can be adjusted. A method of adjustment includes determination of an adjust location on the load beam at which a resonance characteristic to be adjusted is sensitive to changes in mass. The mass distribution of the load beam are adjusted at this adjust location.

11 Claims, 11 Drawing Sheets

MASS BALANCING FOR OPTIMIZING SUSPENSION RESONANCE PERFORMANCE

REFERENCE TO RELATED APPLICATION

This application claims the benefit of U.S. Provisional Application Ser. No. 60/014,336, filed Mar. 29, 1996.

BACKGROUND OF THE INVENTION

1. Field of the Invention

The present invention relates generally to the design and manufacture of disk drive head suspensions. In particular, the present invention is a method for balancing the mass of suspensions to optimize resonance performance, and suspensions having mass balancing structures.

2. Description of the Related Art

Head gimbal assemblies (HGAs), also sometimes known as head suspension assemblies (HSAs), are commonly used in rigid magnetic disk drives to support magnetic heads in close proximity to the rotating disk surfaces. Suspension assemblies of this type typically include an air bearing head slider assembly mounted to a suspension. The suspension includes a load beam having a mounting region on its proximal end and a gimbal or flexure on its distal end. When incorporated into a disk drive the mounting region is mounted to an actuator or positioning arm which supports the suspension assembly over the rotating disk. A baseplate is typically welded to the mounting region to increase the rigidity of the mounting region and to provide a mechanism for securely mounting the suspension assembly to the positioning arm. The load beam is an elongated and often generally triangularly-shaped member which includes a spring region adjacent to the mounting region, and a rigid region which extends from the spring region. The flexure can be manufactured as a separate member and welded to the distal end of the load beam, or formed as an integral member in the distal end of the load beam. The air bearing head slider assembly contains a magnetic head and is typically bonded to the flexure by adhesive. The flexure allows the head slider assembly to move or "gimbal"(about rotational pitch and roll axes) with respect to the distal end of the load beam and thereby follow variations in the surface of the spinning disk. To enable the pivotal flexure movement, the surface of the flexure to which the head slider assembly is bonded is typically spaced from the adjacent surface of the load beam by structures known as load point dimples or formed offsets.

Suspensions are commonly manufactured by chemically etching flat or unformed load beam blanks from thin sheets of stainless steel. Flat and unformed flexure blanks are etched in a similar manner from sheets of stainless steel. During subsequent manufacturing operations side rails, load point dimples and any other structures which extend upwardly or downwardly from the web or generally planar surface of the load beam are formed on the load beam blanks by mechanical bending procedures. Any dimples, offsets or other structures on the flexures requiring deformation of this type are formed in a similar manner. After forming, the flexures are welded to the distal end of the load beams. Baseplates are also welded to the suspensions following the forming operations.

The product of these etching, welding and forming operations are generally flat suspensions (i.e., the mounting region, spring region and rigid region of the load beam are generally coplanar and at the same height. During subsequent manufacturing operations the spring region of the load beam is rolled around a curved mandrel or otherwise bent in such a manner as to plastically bend or permanently deform the spring region. The rolling operation imparts a curved shape to the spring region and causes the flexure to be offset from the mounting region when the suspension is in its unloaded or free state.

As noted above, the suspension supports the slider assembly over the magnetic disk. In reaction to the air pressure at the surface of the spinning disk, the slider assembly develops an aerodynamic force which causes the slider assembly to lift away from and "fly" over the disk surface. To counteract this hydrodynamic lifting force, the head suspension assembly is mounted to the disk drive with the suspension in a loaded state so the bent spring region of the suspension forces the head slider assembly toward the magnetic disk. The height at which the slider assembly flies over the disk surface is known as the "fly height." The force exerted by the suspension on the slider assembly when the slider assembly is at fly height is known as the "gram load."

An important performance-related criteria of a suspension is specified in terms of its resonance characteristics. In order for the head slider assembly to be accurately positioned with respect to a desired track on the magnetic disk, the suspension must be capable of precisely translating or transferring the motion of the positioning arm to the slider assembly. An inherent property of moving mechanical systems, however, is their tendency to bend and twist in a number of different modes when driven back and forth at certain rates known as resonant frequencies. Any such bending or twisting of a suspension can cause the position of the head slider assembly to deviate from its intended position with respect to the desired track. Since the head suspension assemblies must be driven at high rates of speed in high performance disk drives, it is desirable for the resonant frequencies of a suspension to be as high as possible. The detrimental effects of the bending and twisting at the resonance frequencies can also be reduced by minimizing the extent of the bending and twisting motion of the suspension (also known as the gain) at the resonant frequencies.

Common bending and twisting modes of suspensions are generally known and discussed, for example, in the Yumura et al. U.S. Pat. No. 5,339,208 and the Hatch et al. U.S. Pat. No. 5,471,734. Modes which result in lateral or transverse motion (also known as off-track motion) of the head slider are particularly detrimental since this motion causes the head slider to move from the desired track on the disk toward an adjacent track. The three primary modes which produce this transverse motion are known as the sway, first torsion and second torsion modes. The sway mode is a lateral bending mode (i.e., the suspension bends in primarily the transverse direction along its entire length). The first and second torsion modes are twisting modes during which the suspension twists about a rotational axis which extends along the length of the suspension. The first and second torsion modes produce transverse motion of the head slider if the center of rotation of the suspension is not aligned with the gimbal point of the head slider.

Various techniques for compensating for the detrimental effect of resonance modes are known. The Yumura et al. U.S. Pat. No. 5,339,208, for example, states that it is desirable to locate the shear center at the gimbal contact point between the flexure and load beam. The Hatch et al. U.S. Pat. No. 5,471,734 notes that the position, shape and size of the roll or bend in the spring region of the suspension, characteristics sometimes referred to as the radius geometry or radius profile of the suspension, can affect resonance characteristics.

The resonance characteristics of a suspension are also dependent upon the geometry and other characteristics of the rails. In addition to the desired resonance performance, rail design factors include the ability of the suspension to accommodate lead wires extending from the read/write head and volume or size constraints. The rails cannot, therefore, always be designed solely for optimized resonance characteristics.

Integrated lead suspensions have conductive traces which are bonded to and extend along the length of the load beams. The integrated leads can be damaged if bent, and therefore limit the extent to which suspensions of these types can be formed for resonance optimization.

Although suspensions are commonly manufactured from stainless steel which can be formed, other materials such as ceramics, cermets and less formable metals can also be used. Suspensions manufactured from materials of these types are not readily susceptible to conventional forming processes for adjustment of their resonance characteristics.

It is evident that there is a continuing need for suspensions having improved resonance characteristics. In particular, there is a need for methods for adjusting the resonance characteristics of suspensions that do not include forming. Suspensions which can have their resonance characteristics adjusted without the need for load beam forming are also needed. Suspensions and associated adjusting methods which enable the optimization for several resonance characteristics would be particularly advantageous.

SUMMARY OF THE INVENTION

The present invention includes a disk drive suspension capable of being adjusted to improve resonance characteristics and a method of making such adjustments. In particular, the present invention includes a disk drive suspension having a load beam with a distal end, an actuator arm mounting region on a proximal end, and a rigid region. A spring region is between the rigid region and the actuator arm mounting region. A head mounting region is on a distal end of the load beam and is for receiving a transducer head. The disk drive suspension also includes one or more mass balancing structures located on the load beam between the actuator arm mounting region and the head mounting region. The mass balancing structures are adapted for permanent displacement or removal from the load beam to adjust the mass distribution of the load beam.

A method of adjusting resonance characteristics of the disk drive suspension includes determining an adjust location on the load beam at which a resonance characteristic to be adjusted is sensitive to changes in mass. The mass distribution of the load beam is adjusted at the adjust location.

The resonance characteristics of the disk drive suspension of the present invention advantageously can be efficiently optimized at any stage in the manufacture of the suspension, including after the suspension has been incorporated into a head stack assembly. Additionally, the disk drive suspension and method for adjustment thereof advantageously provide for adjustment of several resonance characteristics.

DETAILED DESCRIPTION OF THE PREFERRED EMBODIMENTS

Figure 1:
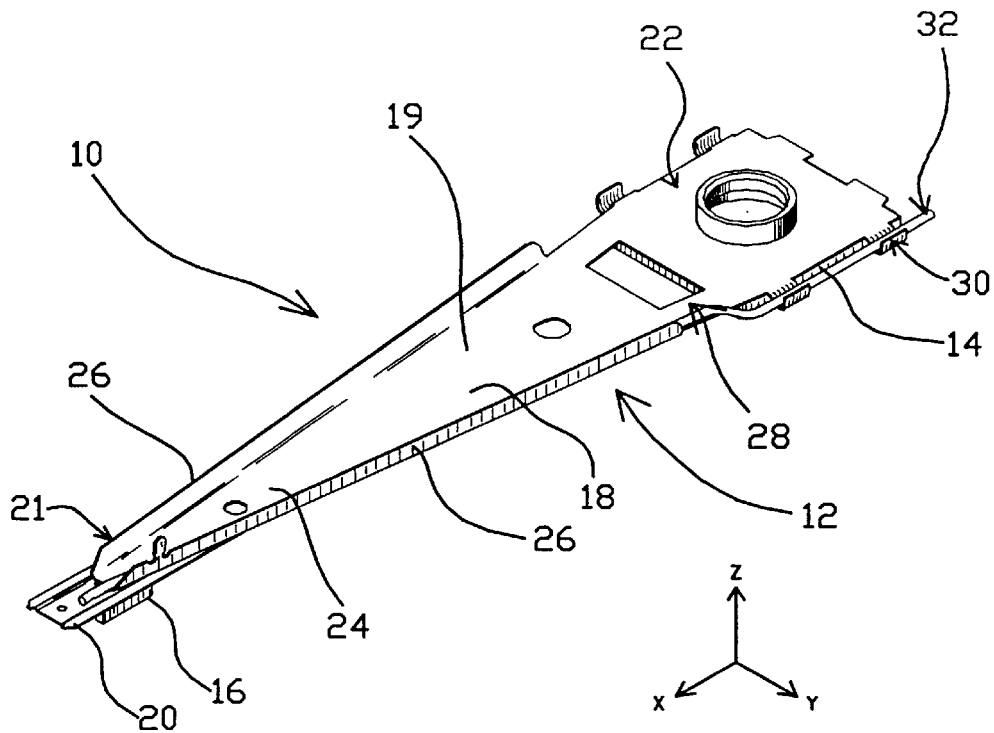
FIG. 1 is an isometric view of a head suspension assembly including a suspension of the type which can be designed and manufactured in accordance with the present invention.
Figure 2:
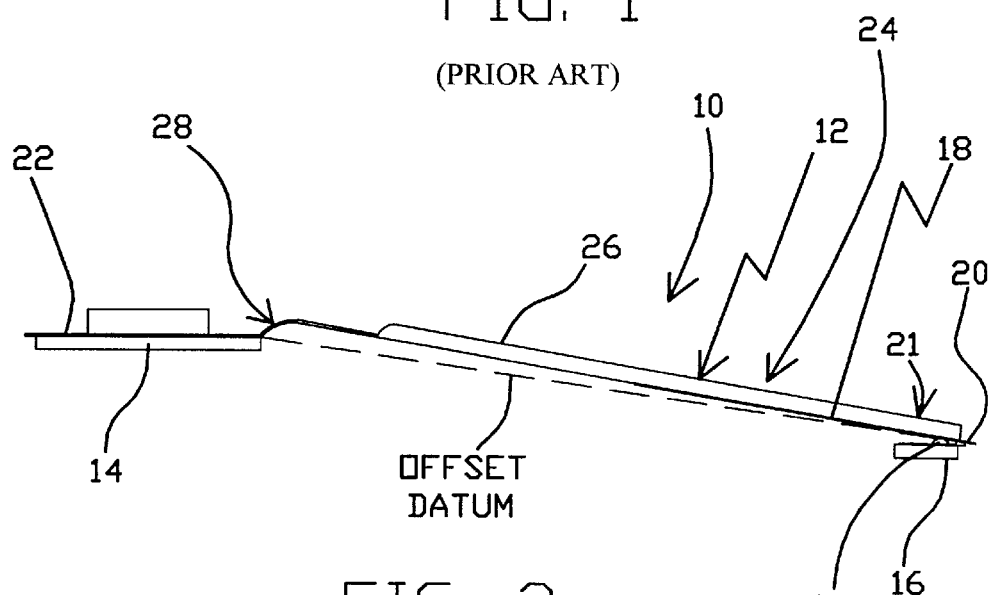
FIG. 2 is a side view of the suspension assembly shown in FIG. 1.

A head suspension assembly 10 having a suspension 12 which can include mass balancing structures and have its resonance characteristics adjusted in accordance with the present invention is illustrated generally in FIGS. 1 and 2. In addition to suspension 12, suspension assembly 10 includes baseplate 14 and air bearing head slider 16. Suspension 12 includes an elongated and generally triangularly shaped load beam 18 and a flexure 20 on a distal end 21 of the load beam. Baseplate 14 is welded to mounting region 22 on the proximal end of the load beam 18. Load beam 18 also includes a relatively rigid region 24 having stiffening side rails 26, and a radius or spring region 28 between the rigid region and mounting region 22. Wire captures 30 can be formed in the load beam 18 to support lead wires 32 extending from the read/write head or transducer (not visible) on the head slider 16. In the embodiment shown, the flexure 20 includes a load point dimple 34 which engages the distal end 21 of the load beam 18 and spaces the portion of the flexure to which the head slider 16 is bonded or otherwise attached away from the load beam. Mounting region 22 is adapted to be attached to an actuator arm of a disk drive (not shown) when the suspension assembly 10 is incorporated into a drive. Dimple 34 effectively functions as a pivot point on which the flexure 20 and head slider 16 can move or "gimbal" about pitch (y-axis) and roll (x-axis) directions to accurately follow the surface topography of the spinning disk (also not shown) over which it is flying.

The side profile of suspension assembly 10 (i.e., the shape of the load beam 18 as seem from the side) can be observed in FIG. 2. This side profile can be characterized or described in terms of the distance between the planar surface or web of the load beam 18 and a reference or offset datum. In the example shown in FIG. 2, the offset datum is a line extending from the portion of the spring region 28 closest to the mounting region 22 through the gimbal point at which the gimbal 34 contacts load beam 18. The distance between the offset datum and the load beam at any location is referred to as the "height" or "offset height" of the load beam or suspension.

Figure 3:
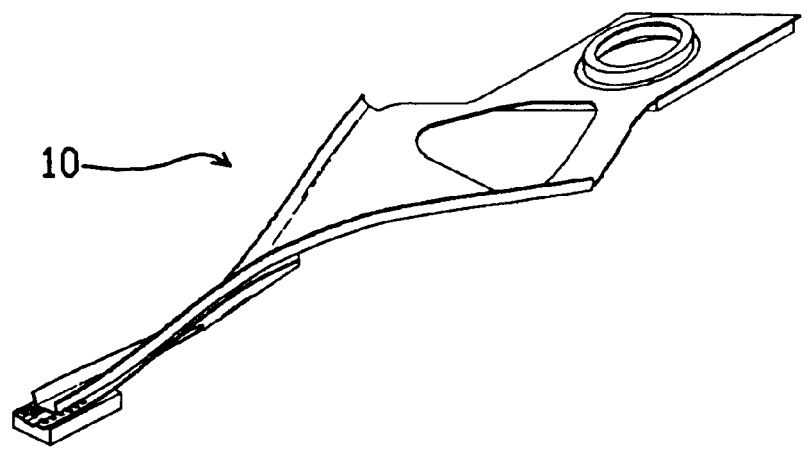
FIG. 3 is an isometric view of the suspension assembly shown in FIG. 1 undergoing twisting motion in the first torsion mode.
Figure 4:
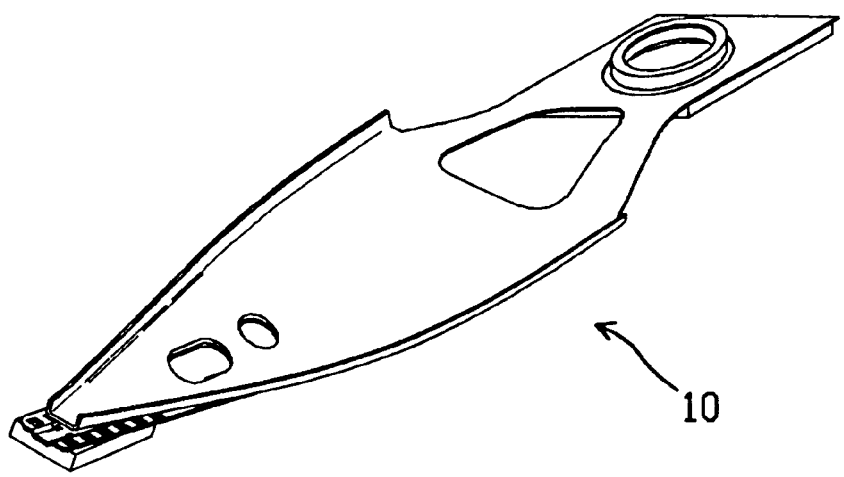
FIG. 4 is an isometric view of the suspension assembly shown in FIG. 1 undergoing twisting motion in the second torsion mode.
Figure 5:
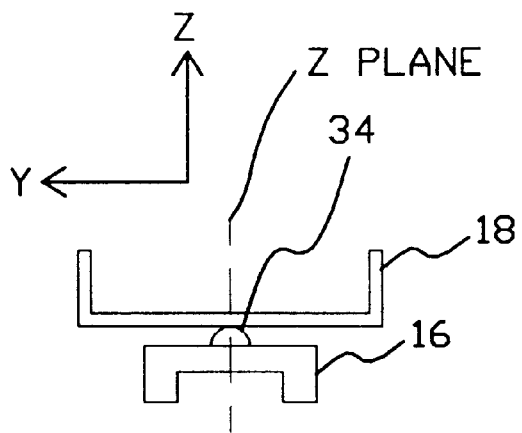
FIG. 5 is a detailed end view of the suspension assembly shown in FIG. 1, illustrating the contact between the dimple and the load beam.
Figure 6:
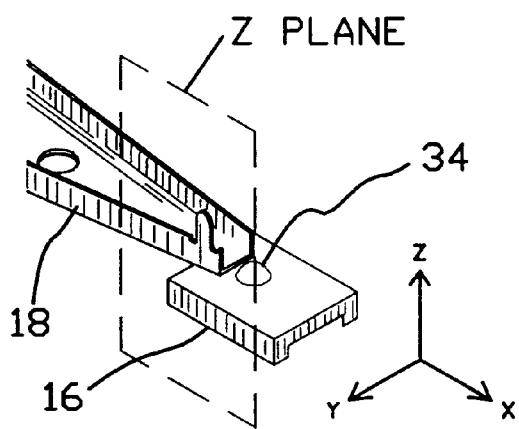
FIG. 6 is a detailed isometric view of the distal end of the suspension assembly shown in FIG. 1, illustrating the contact between the dimple and the load beam.

As is discussed generally in the Description of the Related Art section of this document, when in operation, suspension assemblies such as 10 bend and twist in a number of different modes when driven back and forth at certain rates of speed known as resonant frequencies. FIG. 3 is an illustration of suspension assembly 10 undergoing twisting motion in what is known as the first torsion mode. FIG. 4 is an illustration of suspension assembly 10 undergoing twisting motion in what is known as the second torsion mode. In both the first and second torsion modes the load beam 18 of suspension assembly 10 twists or rotates about a central, longitudinally-oriented rotational axis which will be located in a z-plane extending vertically through the center of the load beam (for a suspension which is symmetrical about the x-axis). The z-plane is illustrated diagramatically with respect to the load beam 18, dimple 34 and slider 16 in FIGS. 5 and 6. The twisting motion produced during the first torsion mode is in generally the same rotational direction along the length of the load beam between the mounting region 22 and the distal end 21. The twisting motion produced during the second torsion mode has a node on the load beam 18 approximately midway between the mounting region 22 and the distal end 21. In the second torsion mode the load beam has little or no twist at the node, while the load beam will be twisted in one rotational direction between the mounting region 22 and the node, and in a second opposite direction between the node and the distal end 21.

The location of the rotational axis within the z-plane will depend upon an number factors related to the load beam 18 itself, such as the mass, thickness, stiffness, shape and material properties of the load beam and its rails 26, and the side profile of the load beam. In general, the resonance characteristics of suspension 10 depend to a large degree upon the center of gravity, shear center and profile of the load beam. The center of gravity is determined by the distribution of mass about the load beam 18. Shear center is determined by such factors as the geometry of the load beam 18 along its length. The position of the center of gravity and shear center along the length of the suspension 12, along with the side profile, determine the axes of rotation for the torsion modes.

Figure 7:
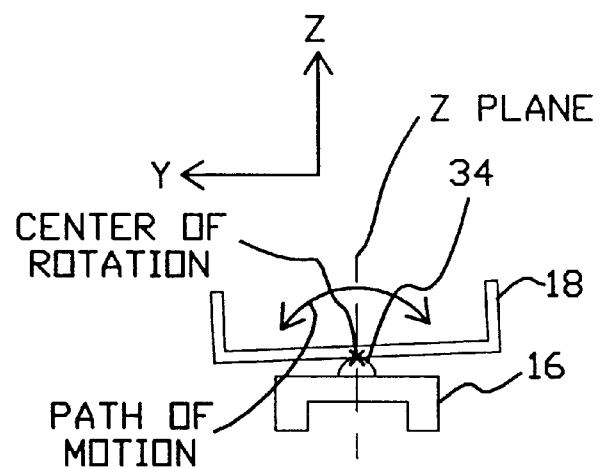
FIG. 7 is a detailed end view of a suspension assembly such as that shown in FIG. 1, and having a center of rotation aligned with or extending through the point of contact between the dimple and load beam.
Figure 8:
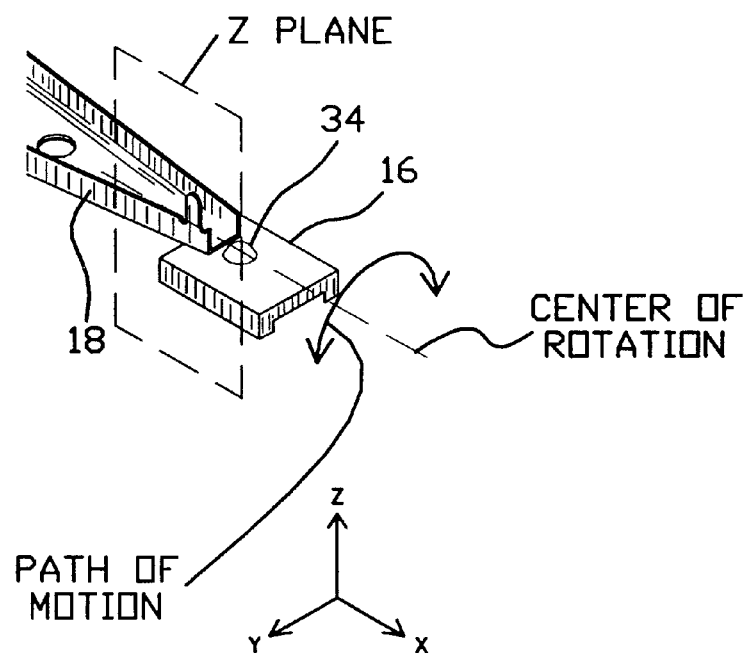
FIG. 8 is a detailed isometric view of the distal end of a suspension assembly such as that shown in FIG. 1, and having a center of rotation aligned with or extending through the point of contact between the dimple and the load beam.
Figure 9:
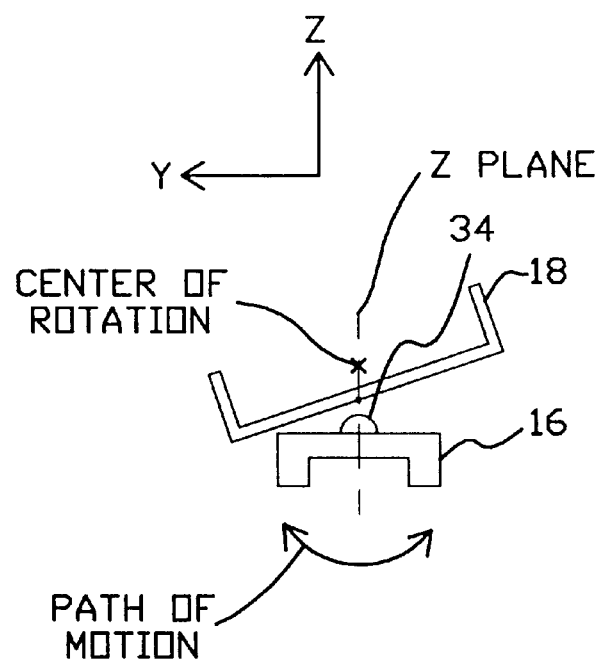
FIG. 9 is a detailed end view of a suspension assembly such as that shown in FIG. 1, and having a center of rotation aligned with or extending through a point which is offset or spaced from the point of contact between the dimple and load beam.
Figure 10:
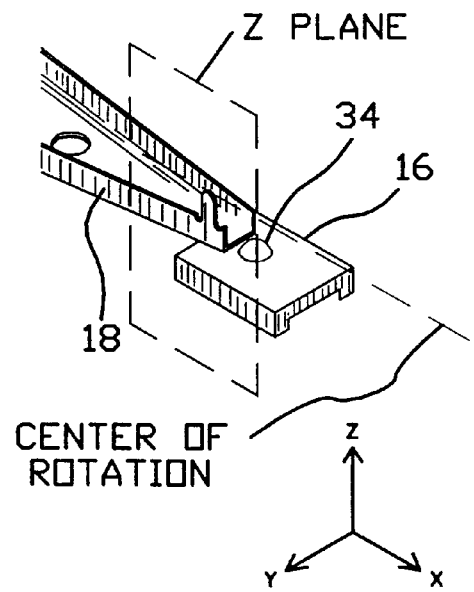
FIG. 10 is a detailed isometric view of the distal end of a suspension assembly such as that shown in FIG. 1, and having a center of rotation aligned with or extending through a point which is offset or spaced from the point of contact between the dimple and the load beam.

If the rotational axis (center of rotation) about which the load beam 18 rotates when undergoing motion in either first or second torsion modes extends through the point at which dimple 34 contacts load beam 18, as shown in FIGS. 7 and 8, the off-track motion of head slider 16 (i.e., the distance the head slider moves along the y-axis) will be relatively small. If, on the other hand, the rotational axis during motion in either the first or second torsion modes is located away from the contact point between the dimple 34 and load beam 18 as shown for example in FIGS. 9 and 10, torsion mode twisting of the load beam will cause relatively large amounts of off-track motion of the head slider 16. Since the greater the distance of the rotational axis of the suspension assembly 10 from the contact point between the dimple 34 and load beam 18 during either of the first and second torsion modes, the greater the magnitude of the off-track motion, it is desirable for these rotational axes to be as close to the gimbal point as possible.

Figure 11:
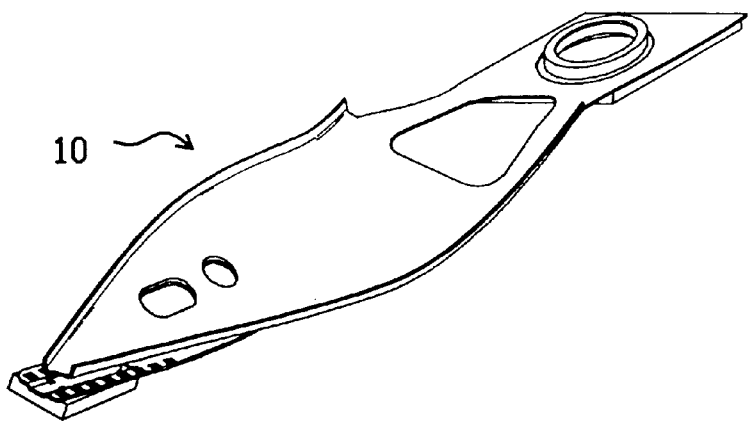
FIG. 11 is an isometric view of the suspension assembly shown in FIG. 1 undergoing bending motion in the sway mode.
Figure 12:
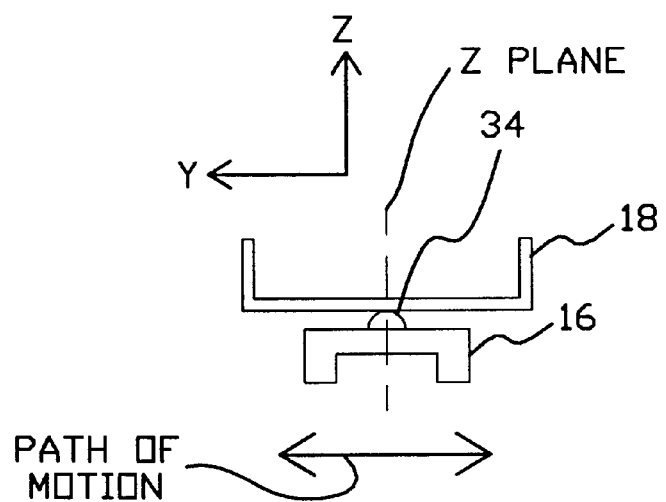
FIG. 12 is a detailed end view of a suspension assembly such as that shown in FIG. 1, illustrating the motion of the head slider in the sway mode.

FIG. 11 is an illustration of suspension assembly 10 undergoing bending motion in what is known as the sway mode. In the sway mode the load beam 18 bends about the y-axis, resulting in off-track motion of head slider 16 about the path of motion illustrated in FIG. 12. Typically, the sway mode exhibits a slight twisting motion as well.

The present invention is a method for adjusting the resonance characteristics of suspensions such as 12 by changing the distribution of mass about the load beam 18. Changing the mass distribution of the load beam 18 will affect to a relatively large degree the center of gravity of the load beam, and to a lesser degree the shear center of the load beam. Mass distribution changes made in accordance with this invention generally have little if any affect on the side profile of the load beam 18.

The sensitivity of the locations of the center of gravity and shear center of the load beam 18 to changes in mass, and therefore the sensitivity of the resonance characteristics of the load beam to changes in mass, varies with the location of the mass changes. It is therefore desirable to determine specific locations, referred to in the remainder of this specification as "high sensitivity locations," at which changes in mass will have the greatest affect on the particular resonance characteristics being optimized. A number of different methods can be used to determine the high sensitivity locations. One approach is to use computerized finite element analysis (FEA). The use of FEA software to model the resonance performance of suspensions such as 12 is generally known, and involves the development of a computerized FEA model of the suspension. The more accurately the FEA suspension model represents the actual load beam 18 for which the resonance performance is being optimized (e.g., the shape, geometry, and thickness of the load beam and rails), the more accurately the high sensitivity locations can be determined. The center of gravity and shear center of the FEA suspension model are varied along the length of the model, and the resulting resonance characteristics of the model variation determined. The resonance characteristics of the model can be graphed as a function of the center of gravity and shear center to provide a visual tool from which the high sensitivity locations can be identified. Alternatively, the high sensitivity locations can be empirically identified from the FEA modeling.

Experimental methods for identifying the high sensitivity locations can also be used. An experimental method would involve producing an actual physical model of the load beam being analyzed, and making variations of the model by adding mass at a range of locations along the length of the model. The resonance characteristics of each variation can be measured using conventional suspension resonance testing equipment, and graphic or empirical analyses performed to identify the high sensitivity locations.

High sensitivity locations can also be identified intuitively. The mass sensitivity of a suspension 12 can be determined by the amount of motion produced in the suspension during the resonance mode bending and/or twisting. For the first torsion mode, it is known that the greatest angular deflection of the suspension 12 will be near the distal end 21 of the suspension. The stiffness sensitivity is related to the change of the mode shape. The base of the suspension (i.e., the portion of the load beam adjacent to the intersection of the mounting region and spring region), will typically exhibit the largest change in resonance characteristics. For the first torsion mode, therefore, changing the mass distribution near the distal end 21 of the suspension 12 will have a relatively large effect on the resonance characteristics (i.e., is a high sensitivity location for mass changes), while changing the stiffness near the base of the suspension would have a relatively large effect on the resonance characteristics (i.e., is a high sensitivity location for stiffness changes). For similar reasons, the distal end 21 of the suspension 12 is a low sensitivity location for stiffness changes.

It is known that for second torsion resonance, the suspension 12 will have a node (a point at which the suspension does not rotate) located approximately midway between the mounting region 22 and the distal end 21 of the suspension. For the second torsion mode, high sensitivity locations for mass changes will be approximately midway between the mounting region 22 and the node location, and near the distal end 21 of the suspension 12. High sensitivity locations for stiffness changes in the second torsion mode are near the base of the suspension 12, and near the location of the node.

The mass adjusting procedure of the present invention can be used to adjust individual suspensions such as 12 which have had their resonance characteristics measured and determined to be out of a desired specification range. Another option is to measure the resonance characteristics of a representative sample number of a larger group of suspensions 12 that are likely to have similar resonance characteristics (e.g., a number of suspensions from a batch that were manufactured together), and to adjust all the suspensions in the group in the same manner. The adjustment can be made at any stage in the manufacture of the suspensions or the disk drives into which they are incorporated. For example, mass adjustment can be made before or after the sliders such as 16 are bonded to the flexures 20, and before or after the suspensions 12 are incorporated into head stack assemblies (mounted to actuator arms).

After it has been determined that a particular resonance characteristic of a suspension such as 12 is to be adjusted through the addition or subtraction of mass, a high sensitivity location for the particular type of adjustment can be selected. By way of example, suspensions such as 12 can have side profiles for which the first torsion mode does not generate any off-track motion, but for which the second torsion mode does. Suspensions 12 of this type can be optimized for both the first and second torsion modes by changing the center of gravity through the addition or removal of mass at a location which is a high sensitivity location for the second torsion mode, but a low sensitivity location for the first torsion mode. For this example, the appropriate location would be a location between the mounting region 22 of the suspension and the second torsion node at the midpoint of the load beam 18. Appropriate locations for the addition and removal of mass for a wide range of other permutations of resonance characteristics to be optimized can be determined by those skilled in the art.

Figure 13:
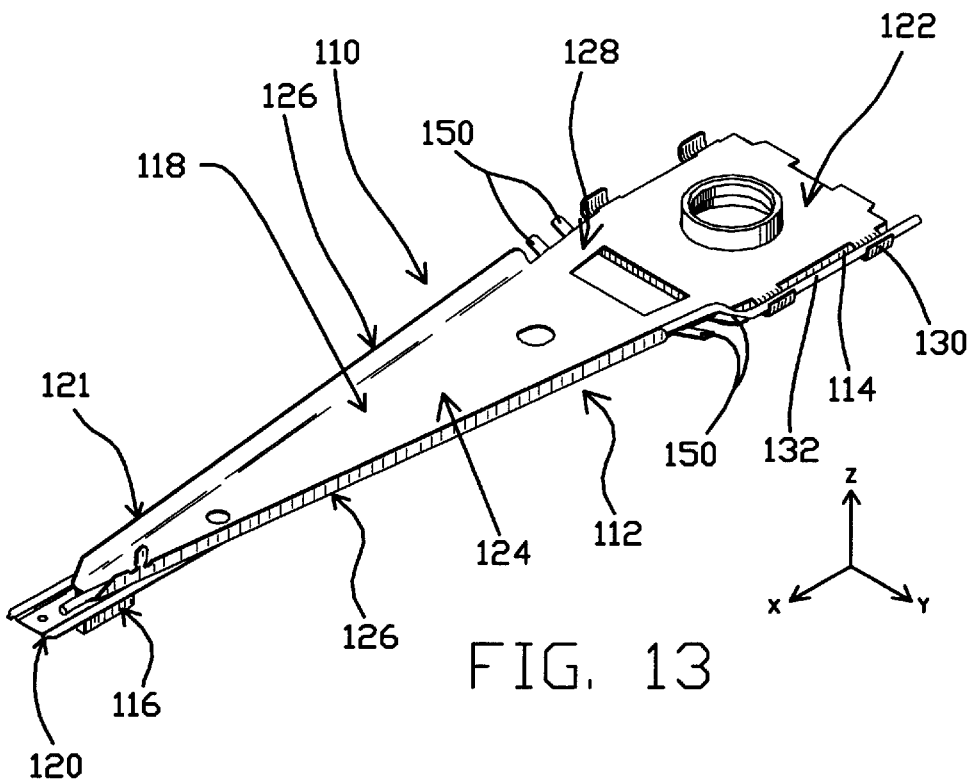
FIG. 13 is an isometric view of a first embodiment of a suspension in accordance with the present invention, having mass-adjusting formable tabs in the spring region.

FIG. 13 is an illustration of a suspension 110 having mass-adjusting formable tabs 150 in the spring region 128. Other than formable tabs 150, suspension 110 can be similar or identical to suspension 10 described above, and similar features are indicated by reference numbers which are incremented by "100." Formable tabs 150 can be bent by a pliers or other tool upwardly and downwardly from the plane of the spring region 128 to raise and lower the center of gravity of the suspension 110.

Figure 14:
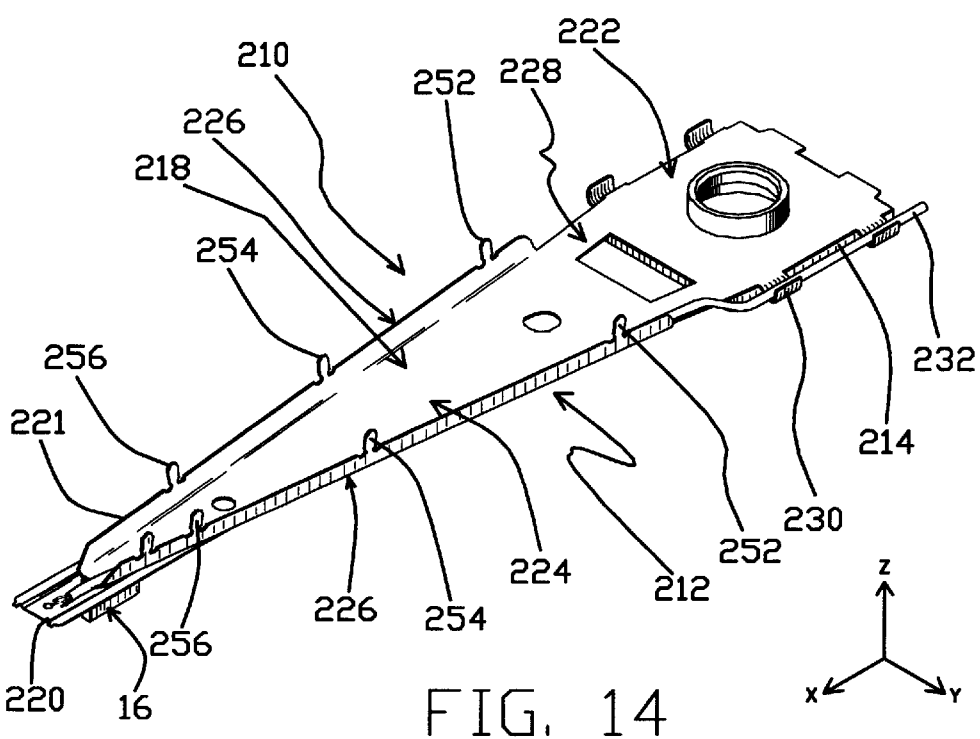
FIG. 14 is an isometric view of a second embodiment of a suspension in accordance with the present invention, having mass-adjusting formable tabs on the rails in the rigid region.

FIG. 14 is an illustration of a suspension 210 having mass-adjusting formable tabs 252, 254 and 256 extending from the stiffening rails 226 of the suspension. Other than formable tabs 252, 254 and 256, suspension 210 can be similar or identical to suspension 10 described above, and similar features are indicated by reference numbers which are incremented by "200." As shown, tabs 252 are located on opposite sides of the rigid region 224 near spring region 228. Tabs 254 are located on opposite sides of the rigid region 224 approximately midway between mounting region 222 and distal end 221 (i.e., near the location of the second torsion node). Tabs 256 are located on opposite sides of the rigid region 224 at the distal end 221. Tabs 252, 254 and/or 256 can be bent upwardly and downwardly toward or away from the center of the rigid region 224 to raise and lower the center of gravity of the suspension 210. Tabs 252, 254 and/or 256 will typically be formed symmetrically (i.e., bent the same amount on opposite sides of the load beam 218) to maintain the center of mass symmetrical with respect to the longitudinal axis of the suspension 210.

Experimental approaches can be used to determine the amount that tabs 150 of suspension 110 and tabs 252, 254 and/or 256 of suspension 210 are to be bent to provide the optimum resonance characteristics. For example, the tabs can be bent a certain limited amount, and the suspension resonance characteristics (e.g., off-track error) measured on a resonance testing instrument. This process can then be repeated until the tab configuration which produces the optimized resonance characteristics is identified. Computerized FEA can also be used to model the suspension with different tab configurations, and to evaluate the resonance characteristics of each such suspension. The appropriate tab configurations will be those that produce the desired resonance characteristics in the FEA model. FEA models can also be generated which indicate the amount of deformation of the tabs or the addition or removal of mass required to produce a certain response. These approaches can also be used in connection with the mass-adjusting structures described below.

Figure 15:
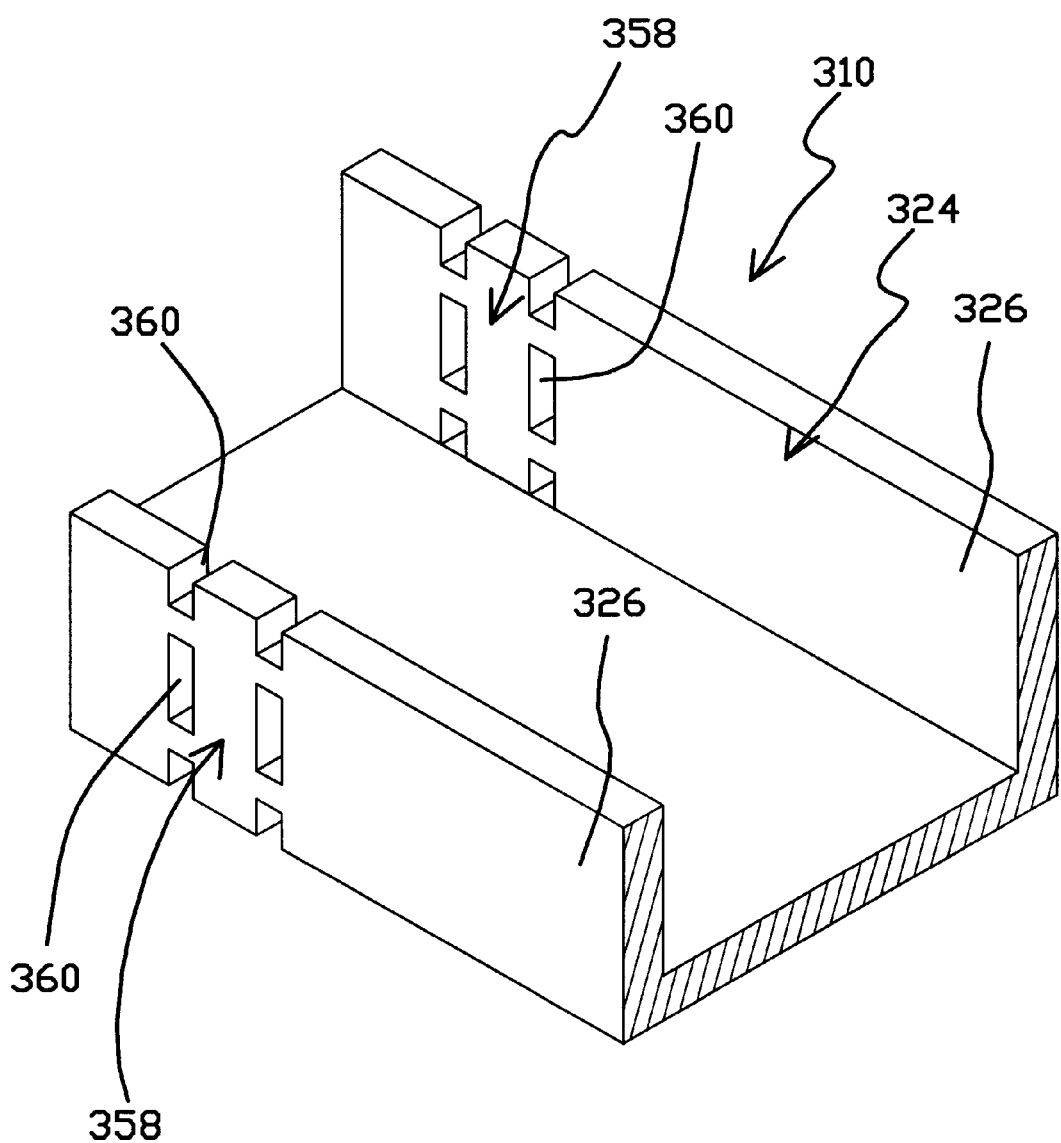
FIG. 15 is an isometric view of a section of an embodiment of a suspension in accordance with the present invention having mass-adjusting punch-out tabs in the rails in the rigid region.

FIG. 15 is an illustration of a section of a rigid region 324 of a suspension 310. Rails 326 include punch-out tabs 358 on opposite sides of the rigid region 324. As shown, punch-out tabs 358 are defined by apertures or gaps 360 in the rails 326 which effectively function as perforations to enable the removal of the tabs. Gaps 360 can be formed in the suspension 310 in the same manner as other features of the suspension (e.g. by through etching or partial etching). Punch-out tabs such as 358 are particularly well suited for suspensions fabricated from ceramics or other materials which are brittle and not susceptible to bending. Tabs such as 358 can be located at any of a number of high sensitivity locations on the suspension 310. Punches, lasers, electron discharge machining or other tooling (not shown) can be used to remove tabs 358.

Figure 16:
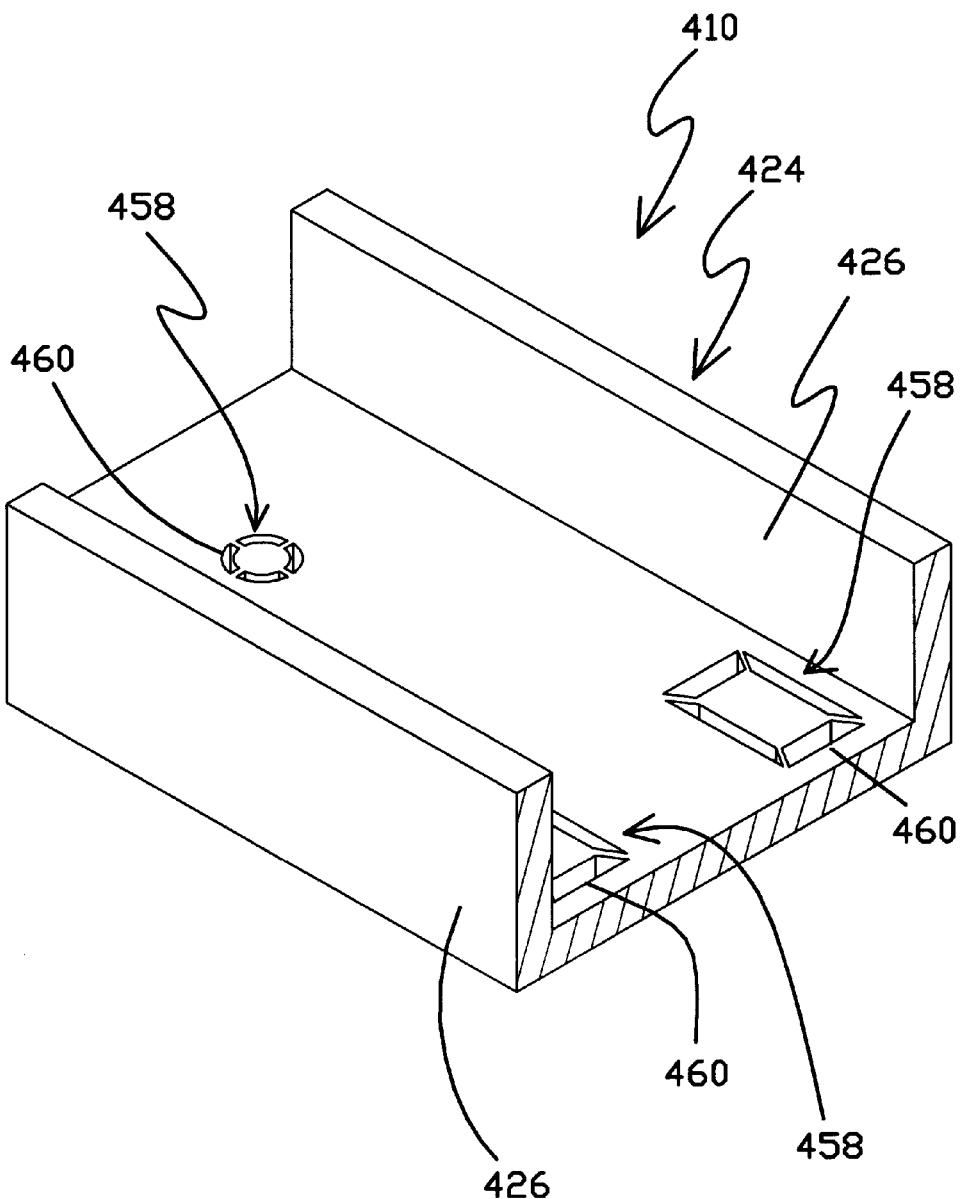
FIG. 16 is an isometric view of a section of an embodiment of a suspension in accordance with the present invention having mass-adjusting punch-out tabs in the web in the rigid region.

FIG. 16 is an illustration of a section of a rigid region 424 of a suspension 410 including mass adjusting punch-out tabs 458 in the web of the rigid region between rails 426. As shown, tabs 458 are defined by perforation gaps 460 and can be located along the longitudinal axis of the suspension 410 (e.g., the round punch-out tab), or positioned in pairs on opposite sides of the longitudinal axis (e.g., the rectangular punch-out tabs). Punch-out tabs such as 458 can also be located in the rails 426.

Figure 17:
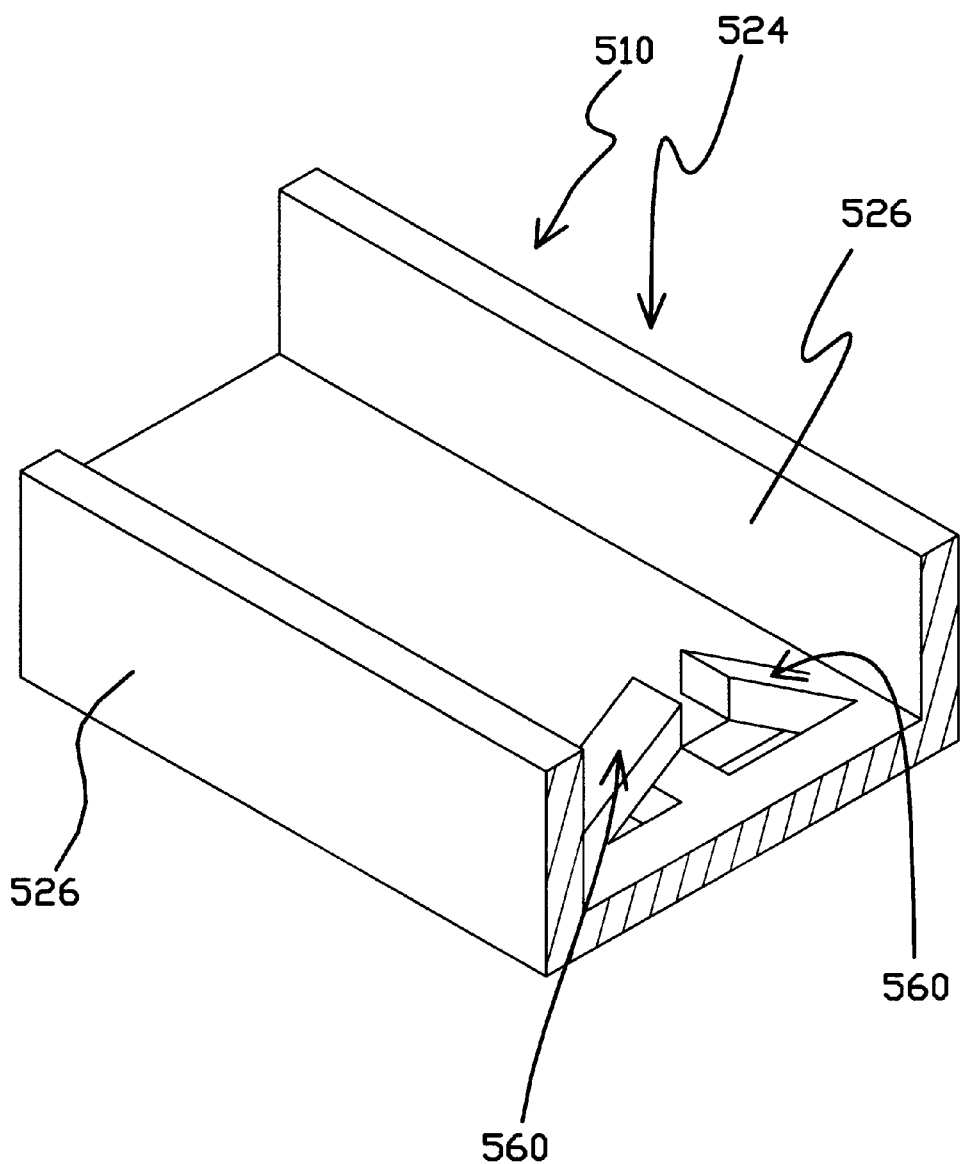
FIG. 17 is an isometric view of a section of an embodiment of a suspension in accordance with the present invention having mass-adjusting formable tabs in the web in the rigid region.

FIG. 17 is an illustration of a section of a rigid region 524 of a suspension 510 including mass-adjusting formable tabs 560 in the web of the rigid region between rails 526. Tabs 560 can be formed by through etching or partial etching the rigid region 524 of the suspension on all sides of the tabs with the exception of one side. Tooling (not shown) can then be used to form the tabs 560 out of the plane of the rigid region 524 to redistribute the mass of the suspension 510.

Figure 18:
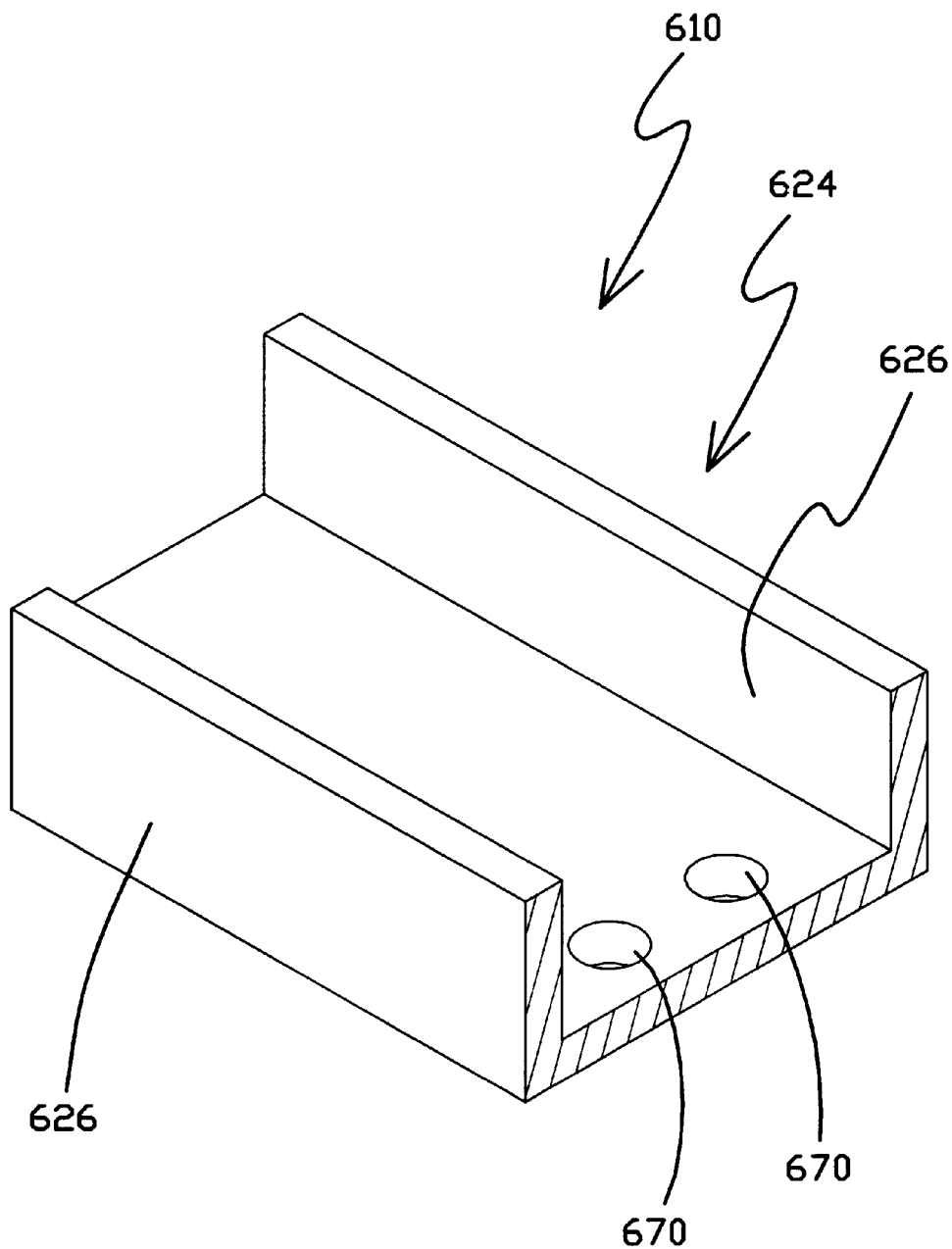
FIG. 18 is an isometric view of a section of an embodiment of a suspension in accordance with the present invention having mass-adjusting added mass structures in the web in the rigid region.

FIG. 18 is an illustration of a section of a rigid region 624 of a suspension 610 including mass-adjusting added mass members 670 in the web of the rigid region between rails 626. Added mass members can, for example, be solidified drops of adhesive or metal, or small sections of metal or other material which are bonded to the suspension 610 to redistribute the mass.

The present invention offers a number of important advantages. By adjusting the mass distribution of a suspension in accordance with the invention the suspension can be optimized for one or more desired resonance characteristics. This optimization can be obtained with little or no changes in the side profile of the suspension, and is therefore particularly well suited for use in connection with suspensions fabricated from materials which cannot be readily formed. The method can also be efficiently implemented using the formable tabs, punch-out tabs and other mass-adjusting structures.

Although the present invention has been described with reference to preferred embodiments, those skilled in the art will recognize that changes can be made in form and detail without departing from the spirit and scope of the invention.

What is claimed is:

1. A disk drive suspension adjusted for enhanced resonance performance including a load beam having a distal end, an actuator arm mounting region on a proximal end, a rigid region, a spring region between the rigid region and actuator arm mounting region, and a head mounting region on a distal end of the load beam for receiving a transducer head, the load beam having one or more mass balancing structures in a first configuration between the actuator arm mounting region and the head mounting region, the disk drive suspension comprising:

the one or more mass balancing structures being adjusted to a second configuration in response to a measurement representative of a resonance characteristic of the suspension to controllably adjust the mass distribution of the load beam and the resonance characteristic to a desired value wherein the one or more mass balancing structures include mass balancing structures adjacent to a second torsion node location between the actuator arm mounting region and distal end of the load beam.

2. A disk drive suspension adjusted for enhanced resonance performance including a load beam having a distal end, an actuator arm mounting region on a proximal end, a rigid region, a spring region between the rigid region and actuator arm mounting region, and a head mounting region on a distal end of the load beam for receiving a transducer head, the load beam having one or more mass balancing structures in a first configuration between the actuator arm mounting region and the head mounting region, the disk drive suspension comprising:

the one or more mass balancing structures being adjusted to a second configuration in response to a measurement representative of a resonance characteristic of the suspension to controllably adjust the mass distribution of the load beam and the resonance characteristic to a desired value wherein the one or more mass balancing structures include mass balancing structures approximately midway between a second torsion node location and the actuator arm mounting region.

3. A disk drive suspension adjusted for enhanced resonance performance including a load beam having a distal end, an actuator arm mounting region on a proximal end, a rigid region, a spring region between the rigid region and actuator arm mounting region, and a head mounting region on a distal end of the load beam for receiving a transducer head, the load beam having one or more mass balancing structures in a first configuration between the actuator arm mounting region and the head mounting region, the disk drive suspension comprising:

the one or more mass balancing structures being adjusted to a second configuration in response to a measurement representative of a resonance characteristic of the suspension to controllably adjust the mass distribution of the load beam and the resonance characteristic to a desired value wherein the one or more mass balancing structures include mass balancing structures approximately midway between a second torsion node location and the distal end of the load beam.

4. A method for adjusting one or more resonance characteristics of disk drive suspensions of the type including a load beam having proximal and distal ends, an actuator arm mounting region on the proximal end and a transducer mounting region on a distal end, the method including:

forming a disk drive suspension with one or more mass balancing structures positioned in a first configuration at adjust locations on the load beam, the adjust locations being where a resonance characteristic to be adjusted is sensitive to changes in mass;

measuring the resonance characteristic of the suspension; and adjusting one or more of the mass balancing structures to a second configuration to adjust the mass distribution of the load beams as a function of the measured resonance characteristic.

5. The method of claim 4 further comprises the step of adding mass to the adjust location.

6. The method of claim 4 further comprising the step of removing mass to the adjust location.

7. The method of claim 4 wherein adjusting the mass distribution includes deforming a deformable tab on the load beam.

8. The method of claim 4 and further including adjusting the mass distribution without substantially affecting the stiffness characteristics of the load beam.

9. The method of claim 4 wherein determining the adjust location includes determining an adjust location at which the resonance characteristic to be adjusted is sensitive to changes in mass and a resonance characteristic not being adjusted is relatively insensitive to changes in mass.

10. The method of claim 4 wherein:
measuring the resonance characteristic includes measuring the resonance characteristic of each suspension to be adjusted; and
adjusting the mass distribution includes adjusting the mass distribution of each suspension to be adjusted as a function of the measured resonance characteristic of the suspension.

11. The method of claim 4 wherein:
measuring the resonance characteristic includes measuring the resonance characteristic of a sample number set of a group of suspensions to be adjusted; and
adjusting the mass distribution includes adjusting the mass distribution of each suspension of the group as a function of the measured resonance characteristic of the sample number set of suspensions.

* * * * *